(12) United States Patent
Shiraishi

(10) Patent No.: US 8,089,675 B2
(45) Date of Patent: Jan. 3, 2012

(54) OPTICAL BEAM SCANNING APPARATUS, OPTICAL BEAM SCANNING METHOD, IMAGE FORMING APPARATUS AND IMAGE FORMING METHOD

(75) Inventor: Takashi Shiraishi, Kanagawa-Ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 603 days.

(21) Appl. No.: 12/208,844

(22) Filed: Sep. 11, 2008

(65) Prior Publication Data

US 2009/0067024 A1 Mar. 12, 2009

Related U.S. Application Data

(60) Provisional application No. 60/971,536, filed on Sep. 11, 2007.

(51) Int. Cl.
*G02B 26/08* (2006.01)
(52) U.S. Cl. ............... 359/205.1; 359/204.1; 359/204.4; 359/216.1; 359/219.2
(58) Field of Classification Search .... 359/201.1–226.2; 347/232–235, 241–244, 250, 256–261
See application file for complete search history.

(56) References Cited

U.S. PATENT DOCUMENTS

| 2004/0104993 A1* | 6/2004 | Yokoyama | 347/241 |
| 2005/0190420 A1* | 9/2005 | Imai et al. | 359/210 |
| 2008/0212155 A1* | 9/2008 | Shoji | 359/198 |

FOREIGN PATENT DOCUMENTS

| JP | 07-256926 | 10/1995 |
| JP | 2001-125020 | 5/2001 |
| JP | 2002-365572 | 12/2002 |
| JP | 2007-178605 | 9/2007 |

* cited by examiner

*Primary Examiner* — James Phan
(74) *Attorney, Agent, or Firm* — Patterson & Sheridan, LLP

(57) ABSTRACT

An optical beam scanning apparatus according to the present invention includes a light source, a pre-deflection optical system, a light deflecting device configured to separate the luminous fluxes in a sub-scanning direction for each of color components and scan the luminous fluxes against a scanning object in the main scanning direction, a post-deflection optical system configured to at least include one or plural first optical elements, plural second optical elements, plural reflection mirrors which are respectively provided on a downstream side of the second optical elements in plural optical paths excluding an optical path in which any one of the second optical elements is included and reflect luminous fluxes emitted from the second optical elements, and a position adjusting mechanism which adjusts positions of the reflection mirrors, imaging the luminous fluxes scanned by the light deflecting device on the scanning object.

16 Claims, 8 Drawing Sheets

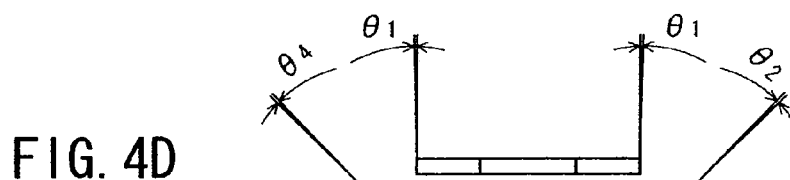
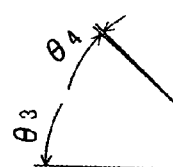
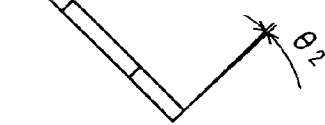
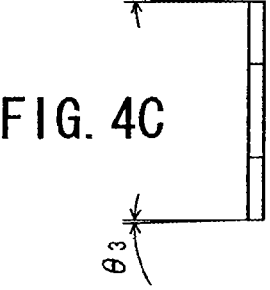
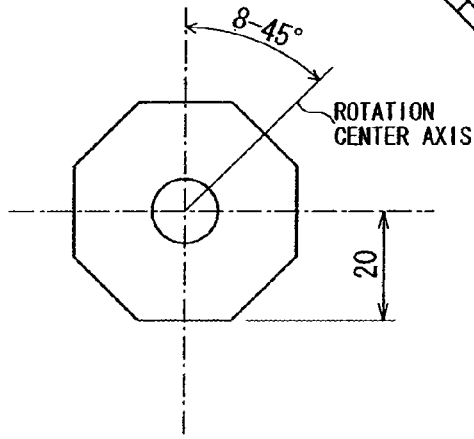
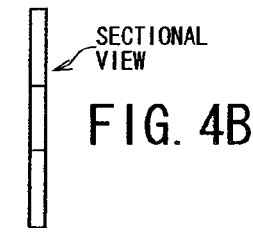
FIG. 4E
FIG. 4D    FIG. 4F
FIG. 4C    FIG. 4B
FIG. 4A

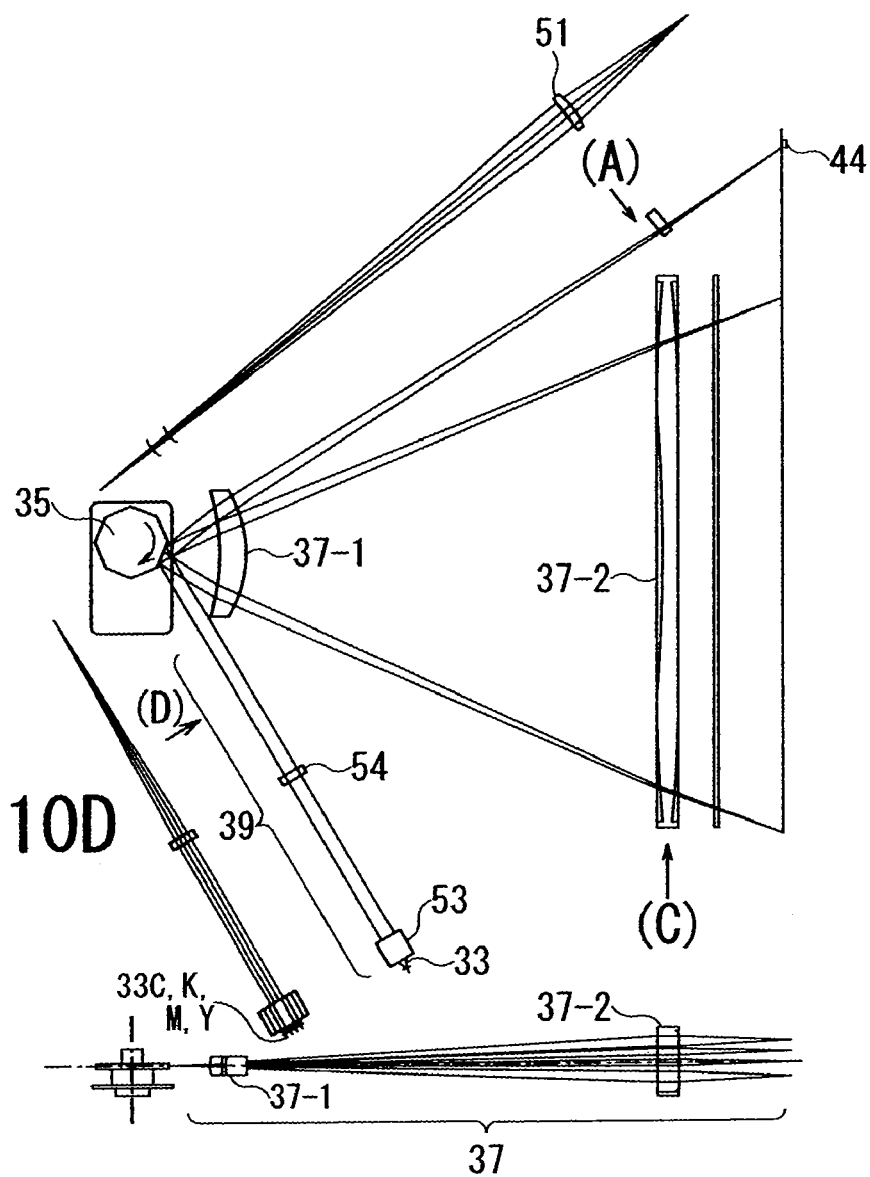

OPTICAL BEAM SCANNING APPARATUS, OPTICAL BEAM SCANNING METHOD, IMAGE FORMING APPARATUS AND IMAGE FORMING METHOD

CROSS-REFERENCE TO RELATED APPLICATIONS

This application is based upon and claims the benefit of priority from: U.S. provisional application 60/971,536, filed on Sep. 11, 2007, the entire contents of which is incorporated herein by reference.

TECHNICAL FIELD

The present invention relates to an optical beam scanning apparatus, an optical beam scanning method, an image forming apparatus including the optical beam scanning apparatus and an image forming method. In particular, the invention relates to an optical beam scanning apparatus that can form plural scanning lines by separating one or plural luminous fluxes, which are emitted from one or plural light sources, in a sub-scanning direction for each of color components using deflection surface of a deflecting device and then, imaging the luminous fluxes by a post-deflection optical system and an image forming apparatus including the optical beam scanning apparatus.

BACKGROUND

In an image forming apparatuses of an electrophotographic system such as a laser printer, a digital copying machine, or a laser facsimile includes an optical beam scanning apparatus that forms an electrostatic latent image on a photoconductive drum by irradiating a laser beam (a light beam) on the surface of a photoconductive drum and scanning the laser beam.

Recently, besides a monochrome machine including a scanning optical system that uses a single light source, a tandem color machine is proposed. For the tandem color machine, a method of increasing the number of laser beams scanned at a time by providing plural light sources (laser diodes) in one laser unit (a multi-beam method) is proposed for the purpose of realizing an increase in speed of scanning on the surface of a photoconductive drum. In the multi-beam method, plural beams for each of color components (e.g., yellow, magenta, cyan, and black) emitted from the respective light sources are subjected to processing in a pre-deflection optical system and are changed to one beam and made incident on a polygon mirror. The beam deflected by the polygon mirror is, after passing through an fθ lens configuring a post-deflection optical system, separated into beams for each of the color components and irradiated on a photoconductive drum for each of the color components.

In JP-A-7-256926, an optical beam scanning apparatus that can provide a color image without color drift at low cost and an image forming apparatus including the optical beam scanning apparatus are known. According to a technique proposed in JP-A-7-256926, the optical beam scanning apparatus includes a finite focal lens and a cylindrical lens that give a predetermined characteristic to lights from plural light sources, a mirror block that unites the lights passing through the lenses, a deflecting device that deflects the united light, first to third shared imaging lenses that adjust an aberration characteristic in a focus position of the deflected light, and one to three reflection mirrors that emit the light passing through the respective imaging lenses in predetermined positions. The reflection mirrors are movable. It is possible to adjust parallelism of a scanning line by moving the reflection mirrors.

Recently, there is also proposed an optical beam scanning apparatus in which an individual imaging lens is provided for each of color components in a post-deflection optical system in order to improve optical accuracy in a scanning optical system in the optical beam scanning apparatus. With the technique proposed in JP-A-7-256926, concerning an optical beam scanning apparatus in which all imaging lenses provided in a post-deflection optical system are shared lenses, it is possible to adjust parallelism of a scanning line by moving the reflection mirrors. However, concerning the optical beam scanning apparatus in which an individual imaging lens is provided for each of color components in the post-deflection optical system, it is difficult to adjust parallelism of a scanning line.

SUMMARY

The present invention has been devised in view of such circumstances and it is an object of the present invention to provide an optical beam scanning apparatus that can suitably adjust parallelism of a scanning line formed in a post-deflection optical system in which an individual imaging lens is provided for each of color components, an optical beam scanning method, an image forming apparatus including the optical beam scanning apparatus, and an image forming method.

In order to solves the problems, an optical beam scanning apparatus according to an aspect of the present invention includes a light source configured to emit one or plural luminous fluxes, a pre-deflection optical system configured to form the luminous fluxes emitted from the light source to image the luminous fluxes as a line image in a direction corresponding to a main scanning direction, a light deflecting device configured to scan the luminous fluxes against a scanning object in the main scanning direction, and a post-deflection optical system configured to at least include one or plural first optical elements which act on the luminous fluxes for all color components, plural second optical elements which respectively act on the luminous fluxes for each of color components, plural reflection mirrors which are respectively provided on a downstream side of the second optical elements in plural optical paths and reflect luminous fluxes emitted from the second optical elements, and a position adjusting mechanism which adjusts positions of the reflection mirrors, imaging the luminous fluxes scanned by the light deflecting device on the scanning object.

In order to solves the problems, an optical beam scanning method according to another aspect of the present invention includes the steps of preparing an optical beam scanning apparatus including one or plural first optical element, plural second optical elements and plural reflection mirrors, emitting one or plural luminous fluxes, forming the luminous fluxes emitted from the light source to image the luminous fluxes as a line image in a direction corresponding to a main scanning direction, scanning the luminous fluxes against a scanning object in the main scanning direction, at least, acting on the luminous fluxes for all color components by one or plural first optical elements, respectively acting on the luminous fluxes for each of color components, and imaging the scanned luminous fluxes on the scanning object, reflecting luminous fluxes emitted from the second optical elements by plural reflection mirrors respectively provided on a downstream side of the second optical elements in plural optical paths, and adjusting positions of the reflection mirrors such that incident positions on the reflection mirrors of the luminous fluxes emitted from the second optical elements are changed. In order to solves the problems, an image forming apparatus according to another aspect of the present invention is an image forming apparatus including an optical beam scanning apparatus, the optical beam scanning apparatus including a light source configured to emit one or plural luminous fluxes, a pre-deflection optical system configured to form the luminous fluxes emitted from the light source to image the luminous fluxes as a line image in a direction corresponding to a main scanning direction, a light deflecting device configured to scan the luminous fluxes against a scanning object in the main scanning direction, and a post-deflection optical system configured to at least include one or plural first optical elements which act on the luminous fluxes for all color components, plural second optical elements which respectively act on the luminous fluxes for each of color components, plural reflection mirrors which are respectively provided on a downstream side of the second optical elements in plural optical paths and reflect luminous fluxes emitted from the second optical elements, and a position adjusting mechanism which adjusts positions of the reflection mirrors, imaging the luminous fluxes scanned by the light deflecting device on the scanning object.

In order to solves the problems, an image forming method according to another aspect of the present invention includes the steps of preparing an image forming apparatus having an optical beam scanning apparatus including one or plural first optical element, plural second optical elements and plural reflection mirrors, emitting one or plural luminous fluxes, forming the luminous fluxes emitted from the light source to image the luminous fluxes as a line image in a direction corresponding to a main scanning direction, scanning the luminous fluxes against a scanning object in the main scanning direction, at least, acting on the luminous fluxes for all color components by one or plural first optical elements, respectively acting on the luminous fluxes for each of color components, and imaging the scanned luminous fluxes on the scanning object, reflecting luminous fluxes emitted from the second optical elements by plural reflection mirrors respectively provided on a downstream side of the second optical elements in plural optical paths, and adjusting positions of the reflection mirrors such that incident positions on the reflection mirrors of the luminous fluxes emitted from the second optical elements are changed.

DESCRIPTION OF THE DRAWINGS

FIGS. 4A to 4F are a plan view, a sectional view, and side views of a polygon mirror main body of a deflecting device used in a scanning optical system of the optical beam scanning apparatus;

FIGS. 10A to 10D are diagrams showing a scanning optical system which has plural pre-deflection optical system, while substantially focusing all luminous fluxes on one deflection surface by a cylindrical lens, forms plural scanning lines by deflecting respective luminous fluxes emitted from respective light sources, using deflection surfaces parallel to a rotation center axis of the deflecting device and then, imaging the luminous fluxes by a post-deflection optical system.

DETAILED DESCRIPTION

An embodiment of the present invention is explained below with reference to the accompanying drawings.

Figure 1:
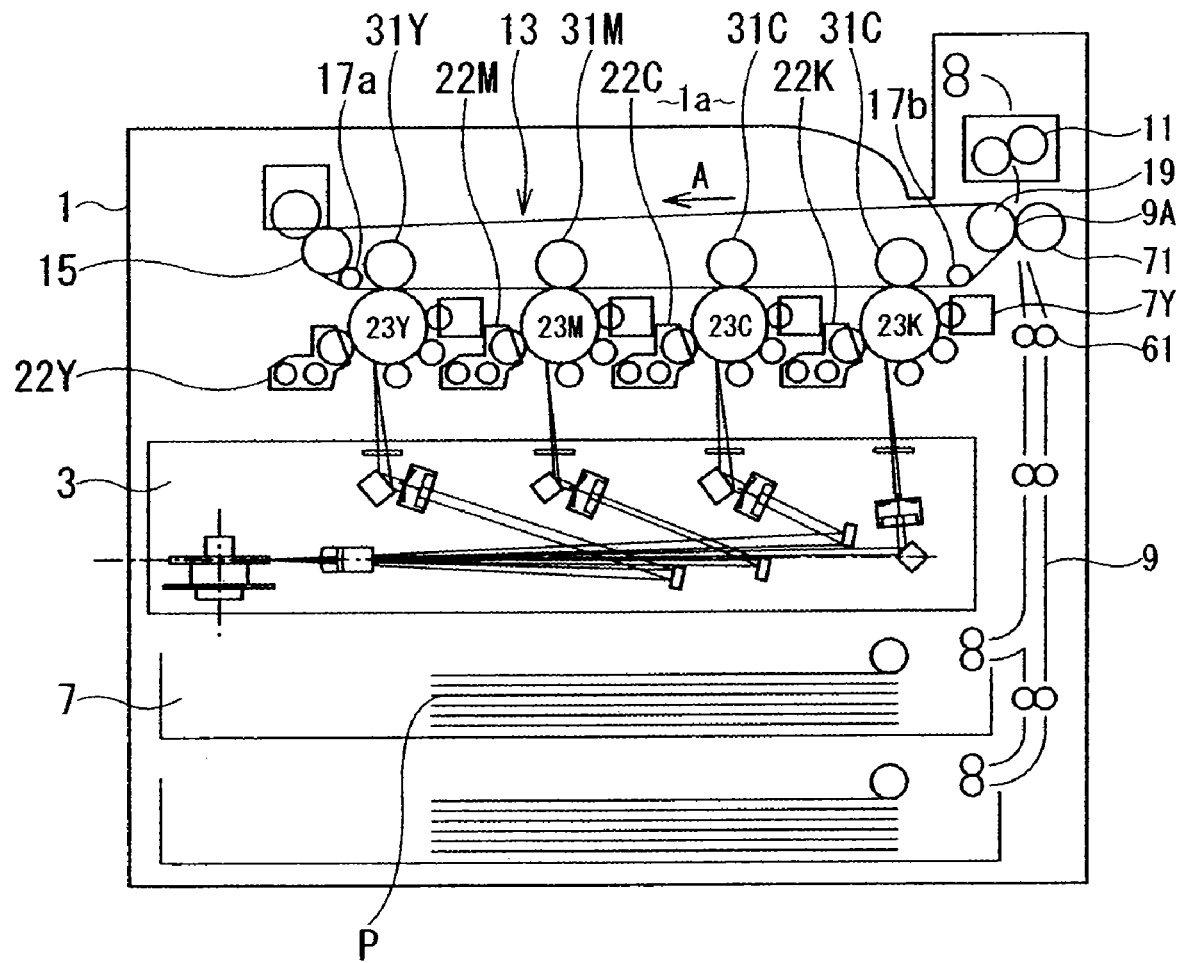
FIG. 1 is a side view showing a configuration of an image forming apparatus having an optical beam scanning apparatus to which the present invention is applied.

FIG. 1 is a diagram showing a configuration of an image forming apparatus 1 having an optical beam scanning apparatus 3 according to an embodiment of the present invention. In the explanation of this embodiment, the image forming apparatus 1 is applied to a color printer. However, the application of the image forming apparatus 1 is not limited to this. The image forming apparatus 1 can also be applied to various image output apparatuses such as a full-color copying apparatus, a facsimile apparatus, and a workstation apparatus.

The image forming apparatus 1 includes the optical beam scanning apparatus (an exposing apparatus) 3 that generates image light corresponding to an image signal and an image forming unit that transfers a toner image visualized by a toner as a developer onto paper P as a transfer medium used for output, which is called hard copy or printout, on the basis of the image light supplied by the optical beam scanning apparatus 3 and outputs the toner image. Every time the toner image is formed, the paper P is fed to the image forming unit from a paper holding unit 7 that holds an arbitrary number of sheet-like pieces of paper P having a predetermined size and can feed the pieces of paper P one by one according timing when the toner image is formed in the image forming unit.

A conveying path 9 that guides the paper P from the paper holding unit 7 to the image forming unit is provided between the paper holding unit 7 and the image forming unit. The conveying path 9 guides the paper P to a fixing device 11 that fixes, on the paper P, the toner image transferred onto the paper P through a transfer device 9A that transfers the toner image formed in the image forming apparatus. As another function, the conveying path 9 guides the paper P having the toner image fixed thereon by the fixing device 11 to an image-output holding unit 1a also serving as a part of a cover that covers the image forming unit.

The image forming unit has an intermediate transfer belt 13 obtained by forming an insulative film having predetermined thickness in an endless belt shape. A belt obtained by forming metal in a thin sheet shape and then, protecting the surface thereof with resin may be applied as the intermediate transfer belt 13. Predetermined tension is applied to the intermediate transfer belt 13 by a driving roller 15, a first tension roller 17a and a second tension roller 17b, and a transfer roller 19. An arbitrary position of the intermediate transfer belt 13 parallel to an axis of the driving roller 15 moves in an arrow A direction when the driving roller 15 is rotated. In other words, a belt surface of the intermediate transfer belt 13 turns in one direction at speed of movement of an outer peripheral surface of the driving roller 15.

First to fourth image forming units 21Y, 21M, 21C, and 21K are arrayed at predetermined intervals in a section in which the belt surface of the intermediate transfer belt 13 moves substantially flat with the predetermined tension applied thereto by the respective rollers (the driving roller 15, the first tension roller 17a and the second tension roller 17b, and the transfer roller 19).

The first to fourth image forming units 21Y, 21M, 21C, and 21K respectively include at least developing devices 22Y, 22M, 22C, and 22K in which toners of arbitrary colors of Y (yellow), M (magenta), C (cyan), and BK (black) are stored and photoconductive drums 23Y, 23M, 23C, and 23K that hold electrostatic latent images developed by the respective developing devices 22 (the developing devices 22Y, 22M, 22C, and 22K). Electrostatic latent images corresponding to images of colors developed by the developing devices 22Y, 22M, 22C, and 22K provided in the respective image forming units 21 are formed, by image light from the optical light scanning apparatus 3, on the surfaces (outer peripheral surfaces) of the photoconductive drums 23Y, 23M, 23C, and 23K included in the respective image forming units 21. Consequently, the toners are selectively supplied by any one of the developing devices 22Y, 22M, 22C, and 22K corresponding to the electrostatic latent images. As a result, toner images of predetermined colors are formed on the photoconductive drums 23Y, 23M, 23C, and 23K, respectively.

In the first to fourth image forming units 21Y, 21M, 21C, and 21K, transfer rollers 31Y, 31M, 31C, and 31K for transferring the toner images held by the respective photoconductive drums 23 onto the intermediate transfer belt 13 are respectively provided in positions opposed to the photoconductive drums 23Y, 23M, 23C, and 23K via the intermediate transfer belt 13. The transfer rollers 31Y, 31M, 31C, and 31K are provided on a rear side of the intermediate transfer belt 13.

A not-shown image-signal supplying unit is provided in the image forming apparatus 1 in which the developing devices 22 (22Y, 22M, 22C, and 22K), the photoconductive drums 23 (23Y, 23M, 23C, and 23K), and the transfer rollers 31 (31Y, 31M, 31C, and 31K) are arrayed as described above. The image-signal supplying unit supplies an image signal for each of color components to the optical beam scanning apparatus 3. The optical beam scanning apparatus 3 generates image light corresponding to the image signal supplied from the image-signal supplying unit and irradiates the generated image light on the surfaces of the photoconductive drums 23 (23Y, 23M, 23C, and 23K) integral with the developing devices 22 (22Y, 22M, 22C, and 22K) that holds the toners of the color components corresponding to the image light. At this point, the respective image forming units 21 form electrostatic latent images at predetermined timing such that the sequentially-transferred toner images are superimposed one on top of another on the intermediate transfer belt 13. The electrostatic latent images are developed (visualized) by the developing devices 22 corresponding to the image forming units 21.

The toner images formed on the photoconductive drums 23 of the respective image forming units 21 are transferred onto the intermediate transfer belt 13 by the transfer rollers 31 (31Y, 31M, 31C, and 31K) as primary transfer devices corresponding to the respective photoconductive drums 23 (23Y, 23M, 23C, and 23K). At this point, the toner images of Y, M, C, and BK are sequentially stacked on the intermediate transfer belt 13 that moves at predetermined speed. In the case of FIG. 1, roller bodies are used as the transfer rollers 31 that are primary transfer devices. However, the transfer rollers 31 are not limited to the roller bodies and may be voltage generating devices such as scrotrons.

A secondary transfer roller 71 as a secondary transfer device is provided in the image forming apparatus 1. The secondary transfer roller 71 comes into contact with the intermediate transfer belt 13 at predetermined pressure in a transfer position 9A of the conveying path 9. The secondary transfer roller 71 as the secondary transfer device transfers a full-color toner image formed on the intermediate transfer belt 13 onto the paper P guided to the transfer position 9A of the conveying path 9.

Registration rollers 61 that temporarily stop the paper P, which is guided from the paper holding unit 7 to the transfer position 9A, is provided in a predetermined position in the conveying path 9 between the paper holding unit 7 and the transfer position 9A. The registration rollers 61 include two rollers. At least one roller rotates in a predetermined direction and the other roller is pressed against one roller at predetermined pressure via a not-shown press-contact mechanism.

The paper P is guided through the conveying path 9 from the paper holding unit 7 to the transfer position 9A and temporarily stopped by the registration rollers 61. This makes it possible to correct a tilt (a tile of the paper P with respect to a conveying direction) that can occur during conveyance through the conveying path 9 from the paper holding unit 7 to the transfer position 9A.

According to timing when the registration roller 61 is rotated again, timing when a toner image carried to the transfer position 9A according to the movement of the belt surface of the intermediate transfer belt 13 reaches the transfer position 9A and timing when the paper P reaches the transfer position 9A are set. This makes it possible to arbitrarily set a position of the toner image with respect to the paper P and manage the position of the toner image with respect to the paper P.

Figures 2A, 2B, 2C:
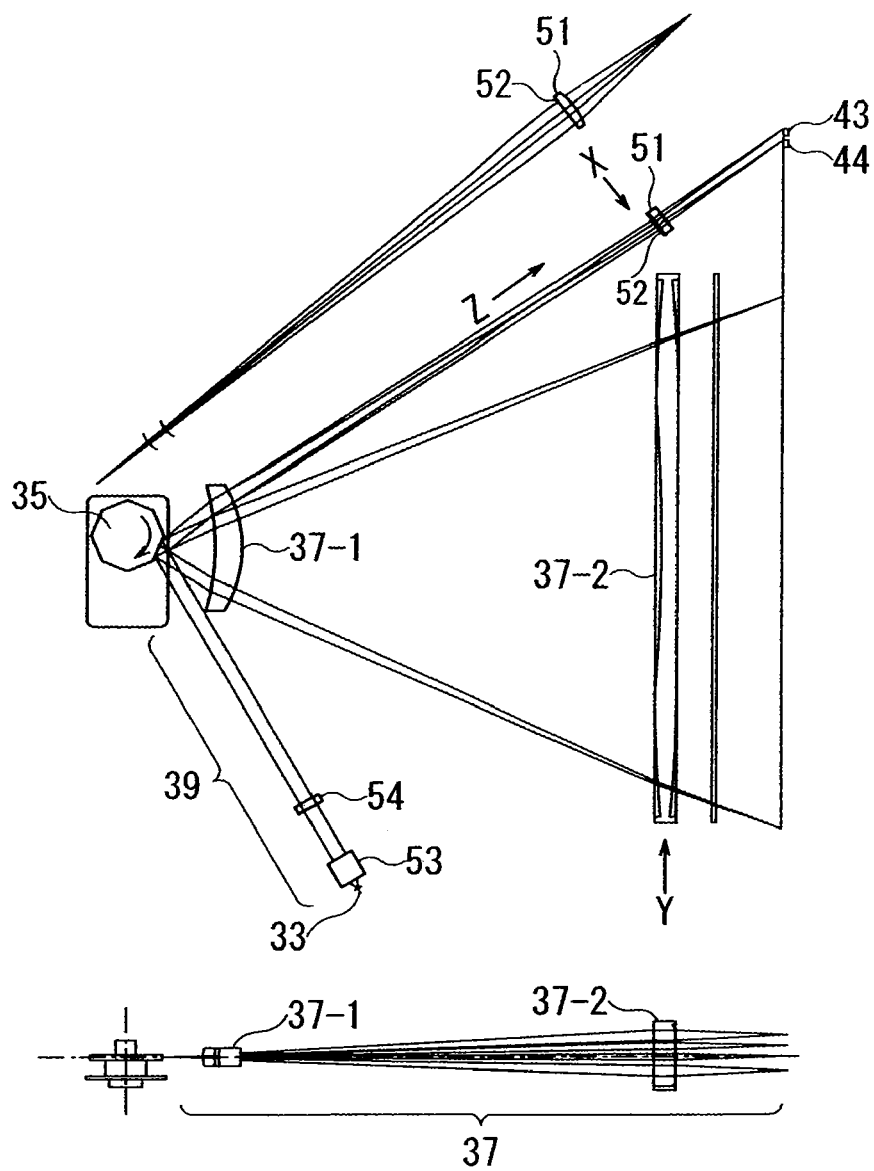
FIGS. 2A to 2C are diagrams showing expansion of reflecting by a reflection mirror provided in the optical beam scanning apparatus.

FIGS. 2A to 2C are diagrams showing expansion of reflection by the reflection mirror provided in the optical beam scanning apparatus 3. FIG. 2A is a diagram viewed from an arrow X direction in FIG. 2B. FIG. 2C is a diagram viewed from an arrow Y direction in FIG. 2B. The optical beam scanning apparatus 3 includes, as shown in FIGS. 2A to 2C, at least a light source (a semiconductor laser) 33 that outputs image light (exposure light), a deflecting device 35 that scans the image light from the light source 33 in a raster direction for output (hard copy or printout) and guides a beam to the respective photoconductive drums 23 arranged at predetermined intervals in the sub-scanning direction, a post-deflection optical system (an image forming optical system) 37 that focuses the image light, which is raster-deflected (scanned) by the deflecting device 35, on the photoconductive drums 23 (23Y, 23M, 23C, and 23K) of the first to fourth image forming units 21 under a predetermined condition regardless of a deflection angle, and a pre-deflection optical system (an exposure light shaping optical system) 39 that guides the image light from the light source 33 to the deflecting device 35 under a predetermined condition.

A direction in which respective laser beams are deflected (scanned) by the deflecting device 35 (a rotation axis direction of the photoconductive drums 23) is defined as "main scanning direction" and a direction perpendicular to the optical axis of the optical system and the main scanning direction is defined as "sub-scanning direction". Therefore, the sub-scanning direction is a drum rotating direction on the photoconductive drum 23.

The deflecting device 35 includes a polygon mirror main body (a so-called polygon mirror) in which, for example, eight plane reflection surfaces (plane reflection mirrors) are arranged in a regular polygonal shape and a motor that rotates the polygon mirror main body in the main scanning direction at predetermined speed. The polygon mirror main body is a rotatable reflection element and fixed to a shaft of the motor. The number of reflection surfaces provided in the polygon mirror main body as the reflection element and the number of revolutions are set according to requirements of output (i.e., resolution and output speed required of the image forming apparatus 1 and other requirements) The reflection surfaces (polygon mirror surfaces) of the deflecting device 35 have required angles with respect to a rotation center axis of the polygon mirror main body such that a beam can be guided to a scanning line position where electrostatic latent images are formed on the respective photoconductive drums 23.

The post-deflection optical system 37 includes at least a shared lens 37-1 used for all scanning lines for forming electrostatic latent images of the respective colors guided to the respective photoconductive drums 23 and an individual lens 37-2 corresponding to each of the scanning lines for forming electrostatic images of the respective colors guided to the respective photoconductive drums 23. The shared lens 37-1 gives different light focusing properties to the image light raster-scanned by the deflecting device 35 according to positions in a longitudinal direction of the respective photoconductive drums 23Y, 23M, 23C, and 23K (i.e., positions on the photoconductive drums 23 that depend on swing angles (deflection angles) of image light caused by raster deflection of the image light in the main scanning direction orthogonal to a direction in which the paper P is conveyed (a direction in which the photoconductive drums 23 are rotated) The shared lens 37-1 has a slender shape extending in the longitudinal direction of the photoconductive drums 23.

The post-deflection optical system 37 includes, besides the shared lens 37-1 and the individual lens 37-2, various optical elements (e.g., a mirror and a filter) for guiding the image light raster-scanned by the deflecting device 35 to the respective photoconductive drums 23Y, 23M, 23C, and 23K of the first to fourth image forming units 21. The shared lens 37-1 and the individual lens 37-2 may be replaced with mirrors having curved surfaces similar to those of these lenses by optimizing types and shapes of optical elements and combining arrays. The replacement with mirrors may be applied to both the shared lens 37-1 and the individual lens 37-2 or may be applied to only one of the lenses.

A focus position (a focus position on a front side in the sub-scanning direction) of the shared lens 37-1 is set further on an upstream side (a side where the rotation center axis of the polygon mirror main body is present; the upstream side may extend beyond the rotation center axis) than the reflection surface (the polygon mirror surface) of the deflecting device 35 such that an inter-beam distance of beams emitted from the shared lens 37-1 for generating electrostatic latent images of the respective colors increases toward downstream of the optical paths.

The pre-deflection optical system 39 forms the image light from the light source 33 such that the image light is formed in (focused in) a sectional beam shape that satisfies a predetermined condition when the image light is raster-scanned by the deflecting device 35 and focused in predetermined positions in the longitudinal direction of the respective photoconductive drums 23Y, 23M, 23C, and 23K in the post-deflection optical system 37. The pre-deflection optical system 39 includes optical elements such as a condenser lens, a mirror, and an aperture.

Predetermined intervals corresponding to positions where the respective image forming units 21 are arrayed (substantially equal intervals on the belt surface of the intermediate transfer belt 13) are given to the image light emitted from the optical beam scanning apparatus 3. Intervals of the image light emitted from the optical beam scanning apparatus 3 are defined to integer times as large as a circumference (a rotation pitch of the driving roller 15) obtained by adding up the diameter of the driving roller 15 and the thickness of the intermediate transfer belt 13. Therefore, even if there is eccentricity or the like in the driving roller 15, since the same period is given when images are formed in the first to fourth image forming units 21, it is possible to reduce the influence of the eccentricity such as color drift.

Figure 3:
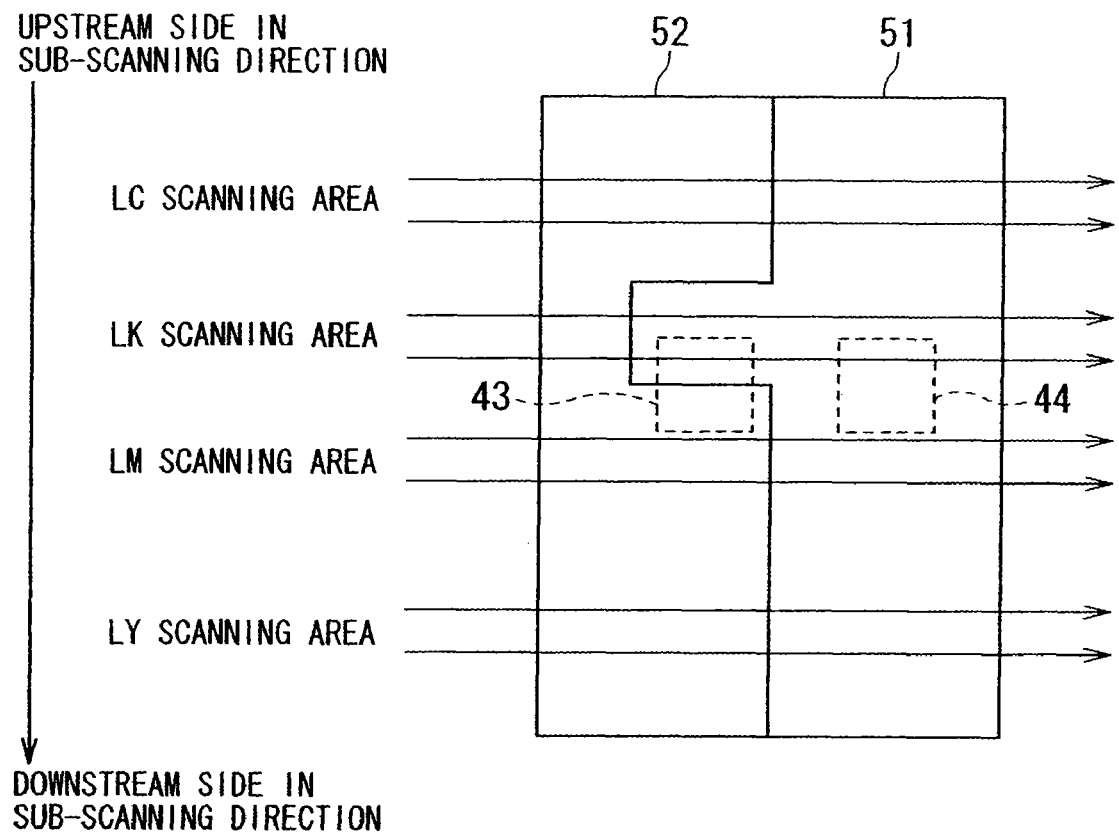
FIG. 3 is an explanatory diagram for explaining a shape of a light blocking plate that blocks optical paths of beams LY, LM, and LC to a surface discrimination sensor arranged on a downstream side of the optical path with respect to optical elements.

The scanning optical system of the optical beam scanning apparatus 3 includes a surface discrimination sensor 43 that outputs a signal only when the beam LK of BK (black) is scanned on the polygon mirror surface and a horizontal synchronizing sensor 44 for determining timing for drawing an image in the main scanning direction. A beam made incident on the horizontal synchronizing sensor 44 passes through the shared lens 37-1 and, then, passes through an optical element 51. The optical element 51 focuses beams passing through the different optical paths on the horizontal synchronizing sensor 44 in the sub-scanning direction while setting heights in the sub-scanning direction of all the optical paths substantially identical on the surface of the horizontal synchronizing sensor 44. The optical element 51 is a convex cylindrical lens on a surface on one side (a surface on the downstream side of the optical paths) thereof in this embodiment. A light blocking plate 52 is arranged on the upstream side of the optical path of the optical element 51. As shown in FIG. 3, the light blocking plate 52 has a shape for blocking the optical path of the beams LY, LM, and LC to the surface discrimination sensor 43 arranged on the downstream side of the optical paths with respect to the optical element 51. The light blocking plate 52 causes only the beam LK to pass through the surface discrimination sensor 43 via the optical element 51. In this embodiment, as shown in FIG. 3, the four beams LY, LM, LC, and LK emitted from the shared lens 37-1 after being deflected by the deflecting device 35 are arrayed in order of the beams LC, LK, LM, and LY from the upstream side in the sub-scanning direction to the downstream side in the sub-scanning direction. However, the array of the beams LC, LK, LM, and LY is not limited to this. The beams LC, LK, LM, and LY may be arrayed in order of the beams LY, LM, LK, and LC from the upstream side in the sub-scanning direction to the downstream side in the sub-scanning direction.

On the other hand, the light blocking plate 52 causes all the beams LY, LM, LC, and LK to pass through, via the optical element 51, the horizontal synchronizing sensor 44 arranged on the downstream side of the optical paths with respect to the optical element 51. This makes it possible to suitably adjust, while discriminating the black laser beam among the laser beams of the respective colors guided from the deflecting device 35 via the optical element 51 by the surface discrimination sensor 43, phases of the laser beams of the respective colors for each of the laser beams. Further, it is possible to prevent occurrence of color drift even in a situation in which there is an error in accuracy of an angle of the deflection surface of the deflecting device 35 and an error is likely to occur in rotating speed of the deflecting device 35. Moreover, it is possible to prevent occurrence of distortion in an image of a single color.

It goes without saying that the light blocking plate 52 may cause any one of the beams LY, LM, and LC to pass through the surface discrimination sensor 43 rather than causing only the beam LK to pass through the surface discrimination sensor 43. In this embodiment, the optical element 51 is provided in the optical paths between the optical element 37-1 that acts on the light beams deflected by all the deflection surfaces of the deflecting device 35 and the horizontal synchronizing sensor 44. However, the optical element 51 may be provided in the optical paths between the deflecting device 35 and the horizontal synchronizing sensor 44.

FIGS. 4A to 4F are a plan view, a sectional view, and side view of the polygon mirror main body of the deflecting device 35 used in the scanning optical system of the optical beam scanning apparatus 3. FIG. 4A is a plan view of the polygon mirror main body of the deflecting device 35. FIG. 4B is a sectional view of the polygon mirror main body. FIGS. 4C to 4F are side views of the polygon mirror main body of the deflecting device 35 viewed from a predetermined direction.

Figure 5:
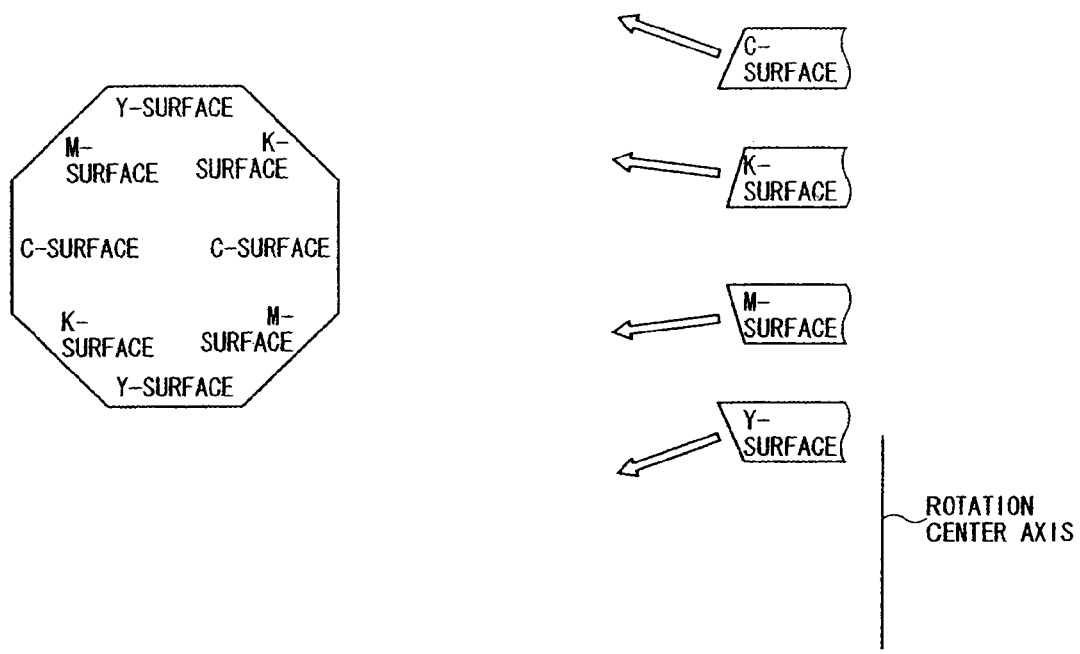
FIG. 5 is a diagram showing a state in which a reflection surface (Y surface) of the polygon mirror that reflects beams LY, LM, LC, and LK tilts in a direction for approaching a rotation axis direction.

The sectional view of the polygon mirror main body of the deflecting device 35 shown in FIG. 4B shows a reference surface in setting a tilt of the reflection surfaces of the polygon mirror main body. A motor is provided on an A side of the reference surface via a not-shown shaft. As shown in FIGS. 4C to 4F, the reflection surfaces of the polygon mirror main body (the polygon mirror) have required tilts with respect to the rotation center axis (a rotation center axis of the motor, in other words, a hole center axis of the polygon mirror main body). Absolute values of the tiles of the reflection surfaces are maximum and equal at $\theta_1$ and $\theta_3$ and signs of the tilts are set opposite. The tilts have a relation of $\theta_1 = -\theta_3$ and have a relation of $\theta_1 > \theta_2 > \theta_4 > \theta_3$ or $\theta_1 < \theta_2 < \theta_4 < \theta_3$. For example, when a value of $\theta$ is a minus numerical value, this means that the reflection surface tilts in a direction closer to a rotation axis direction as the reflection surface is further away from the reference surface A. When a value of $\theta$ is a plus numerical value, this means that the reflection surface tilts in the direction closer to the rotation axis direction as the reflection surface is further away from a surface on the opposite side of the reference surface A. Specifically, for example, as shown in FIG. 5, the reflection surface (C surface) that reflects the beam LC of the color component C and the reflection surface (K surface) that reflects the beam LK of the color component K tilt in the direction closer to the rotation axis direction as the reflection surfaces are further away from the surface on the reference plane A. The reflection surface (M surface) that reflects the beam LM of the color component M and the reflection surface (Y surface) that reflects the beam LY of the color component Y tilt in the direction away from the rotation axis direction as the reflection surfaces are further away from the reference surface A.

By arranging the reflection surfaces in this way, it is possible to control a maximum value of a tilt angle of the reflection surfaces of the polygon mirror main body to be as small as possible compared with other those in other arrangements. Since deterioration in a focusing characteristic increases as the tilts of the reflection surfaces of the polygon mirror main body increase, it is possible to suitably control the deterioration in the focusing characteristic.

Figure 6:
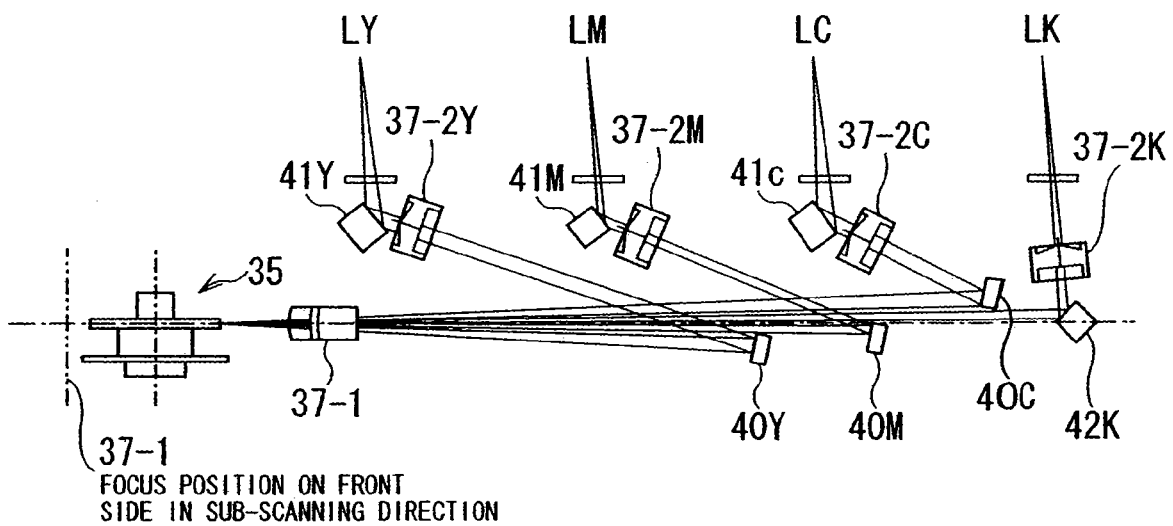
FIG. 6 is a diagram showing a detailed configuration of the optical beam scanning apparatus shown in FIG. 1.

In FIG. 6, optical paths for guiding beams to the respective photoconductive drums 23Y, 23M, 23C, and 23K using two reflection mirrors 40 and 41 for the three colors of Y, M, and C and using one reflection mirror 42 for one color of BK are shown. As described above, the focus position (the focus position on the front side in the sub-scanning direction) of the shared lens 37-1 is set further on the upstream side (the side where the rotation center axis of the polygon mirror main body is present; the upstream side may extend beyond the rotation center axis) than the reflection surface (the polygon mirror surface) of the deflecting device 35 such that an interbeam distance of beams emitted from the shared lens 37-1 for generating electrostatic latent images of the respective colors increases toward downstream of the optical paths. Consequently, beams further on the upstream side of the optical paths in reflection mirrors 40Y, 40M, 40C, and 42K for separating, for each of the color components, the beams raster-deflected by the deflecting device 35 have wider intervals in the same position in a beam traveling direction. The four reflection mirrors are arranged in order of the reflection mirrors 40Y, 40M, 40C, and 42K in order from the upstream side. The intervals in the same position in the beam traveling direction are in a relation of LY-LM>LM-LK>LK-LC.

In optical paths of beams reflected by the sets of the two reflection mirrors 40 and 41, individual lenses 37-2 (37-2Y, 37-2M, and 37-2C) are arranged between the sets of the two reflection mirrors 40 and 41, respectively. On the other hand, in an optical path of a beam reflected by the one reflection mirror 42K, an individual lens 37-2K is arranged after the reflection mirror 42K is arranged. In this embodiment, the beams LC and LY are beams at both the ends in the sub-scanning direction. The beam LY at one end in the sub-scanning direction is reflected by the reflection mirror 40Y on the most upstream side. The beam LC at the other end in the sub-scanning direction is reflected by the reflection mirror 40C second from the most downstream side. The reflection mirror 40C is chamfered in advance not to block the optical path of the beam L.

With the technique proposed in JP-A-7-256926, concerning an optical beam scanning apparatus in which all focusing lenses provided in the post-deflection optical system 37 are shared lenses, it is possible to adjust parallelism of a scanning line by moving the reflection mirrors. However, concerning the optical beams scanning apparatus 3 in which the individual lens 37-2 (37-2Y, 37-2M, 37-2C, or 37-2K) as an individual focusing lens is provided for each of the color components in the post-deflection optical system 37, it is difficult to adjust parallelism of a scanning line. Therefore, in the optical beam scanning apparatus 3 in which the individual lens 37-2 is provided for each of the color components in the post-deflection optical system 37, a position adjusting mechanism 70 for adjusting positions of the reflection mirrors 41Y, 41M, and 41C that fold beams emitted from the individual lenses 37-2 among the reflection mirrors 40 and 41 is provided. When parallelism of scanning lines of the respective color components deviate because of an error during manufacturing of a housing, in order to correct the parallelism of the scanning lines, positions of the reflection mirrors 41Y, 41M, and 41C are appropriately adjusted. This makes it possible to suitably adjust parallelism of a scanning line formed in the post-deflection optical system 37 in which the individual focusing lens (the individual lens 37-2) is provided for each of the color components. The position adjusting mechanism 70 is explained below. The position adjusting mechanism 70 that adjusts a position of each of the reflection mirrors 41Y, 41M, and 41C is provided in the optical beam scanning apparatus 3.

Figure 7A:
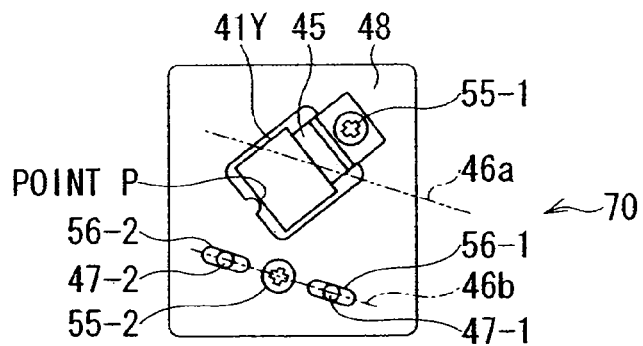
FIGS. 7A and 7B are diagrams showing a position adjusting mechanism that adjusts a position of a reflection mirror on a downstream side of an optical path of an individual lens.
Figure 7B:
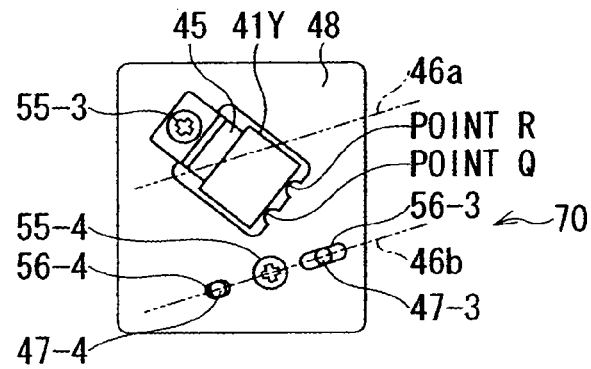

FIGS. 7A and 7B show the position adjusting mechanism 70 for adjusting a position of, for example, the reflection mirror 41Y among the reflection mirrors 41Y, 41M, and 41C. FIG. 7A is a side view of one end of the position adjusting mechanism 70. FIG. 7B is a side view of the other end of the position adjusting mechanism 70. As shown in FIG. 7A, the reflection mirror 41Y is pressed against and fixed to a sheet metal 48 via a blade spring 45 at a point P. The blade spring 45 is screwed to the sheet metal 48 by a screw 55-1. An alternate long and two short dashes line 46a shown in FIG. 7A indicates an incident optical path of the beam LY. Two projected sections 47-1 and 47-2 on an optical housing used for adjusting a position of the reflection mirror 41Y are inserted into long holes 56-1 and 56-2 provided in the sheet metal 48 and, then, provided on an alternate long and two short dashes line 46b parallel to the alternate long and two short dashes line 46a. This allows the sheet metal 48 to move in parallel to the alternate long and two short dashes line 46a on a side at one end of the position adjusting mechanism 70 shown in FIG. 7A. Therefore, when the sheet metal 48 is moved by a predetermined distance in parallel to the alternate long and two short dashes line 46a, according to the movement of the sheet metal 48, the reflection mirror 41Y fixed to the sheet metal 48 also moves in parallel to the alternate long and two short dashes line 46a by an amount of movement identical with an amount of movement of the sheet metal 48.

On the other hand, as shown in FIG. 7B, the reflection mirror 41Y is pressed against and fixed to the sheet metal 48 via the blade spring 45 at points Q and R on the other end side. The blade spring 45 is screwed to the sheet metal 48 by a screw 55-3. The alternate long and two short dashes line 46a shown in FIG. 7B is also an incident optical path of the beam LY. A projecting section 47-3 on the optical housing used for adjusting a position of the reflection mirror 41Y is inserted into a long hole 56-3 provided in the sheet metal 48 and, then, provided on the alternate long and two short dashes line 46b parallel to the alternate long and two short dashes line 46a. On the other hand, a projecting section 47-4 on the optical housing used for adjusting a position of the reflection mirror 41Y is inserted and fixed in a hole 56-4 provided in the sheet metal 48. Consequently, the sheet metal 48 cannot move in parallel to the alternate long and two short dashes line 46a and is substantially fixed on a side at the other end of the position adjusting mechanism 70 shown in FIG. 7B.

The beam LK is used as a reference for correcting parallelism of scanning lines of the respective color components due to an error during manufacturing of the housing. Therefore, the position adjusting mechanism 70 is not provided for the reflection mirror 41K.

An effect described below is realized by providing the position adjusting mechanism 70 shown in FIGS. 7A and 7B. When the sheet metal 48 is moved by a predetermined distance in parallel to the alternate long and two short dashes line 46a, according to the movement of the sheet metal 48, the reflection mirror 41Y moves in parallel to the alternate long and two short dashes line 46a by an amount of movement identical with an amount of movement of the sheet metal 48. Consequently, an incident position of the beam LY made incident on the optical path indicated by the alternate long and two short dashes line 46a changes. The beam LY is reflected by the photoconductive drum 23Y at a reflecting angle different from that before position adjustment. Therefore, by moving the sheet metal 48 by the predetermined distance in parallel to the alternate long and two short dashes line 46a, it is possible to suitably adjust parallelism of a scanning line formed in the post-deflection optical system 37 in which the individual focusing lens (the individual lens 37-2) is provided for each of the color components.

Figure 8A:
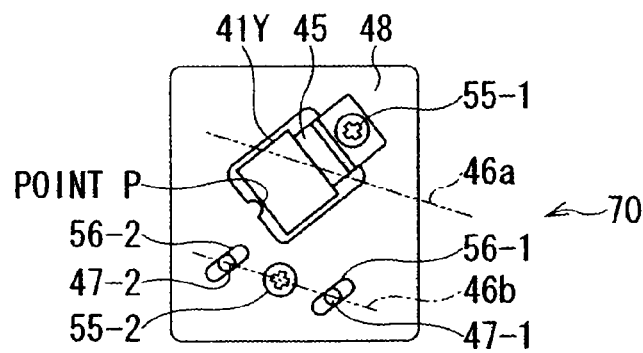
FIGS. 8A and 8B are diagrams showing another position adjusting mechanism that adjusts a position of the reflection mirror on the downstream side of the optical path of the individual lens.
Figure 8B:
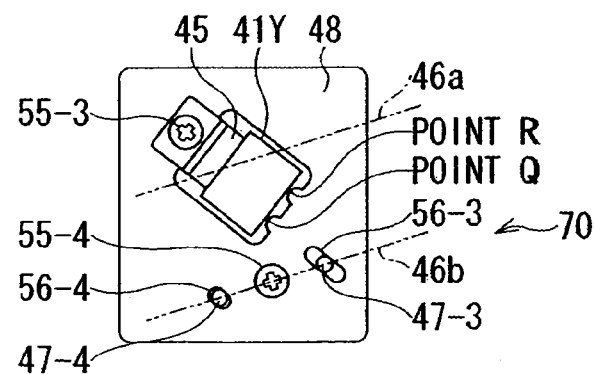

In the case of the position adjusting mechanism 70 shown in FIGS. 7A and 7B, the sheet metal 48 is moved by the predetermined distance in parallel to the alternate long and two short dashes line 46a. However, the present invention is not limited to such a case. For example, as shown in FIGS. 8A and 8B, the sheet metal 48 maybe moved by a predetermined distance in a direction orthogonal to a mirror reflection surface. Position adjustment shown in FIGS. 8A and 8B is preferable to position adjustment shown in FIGS. 7A and 7B in terms of preventing extra pressure on the reflection mirror 41.

In the case of FIGS. 7A and 7B, parallelism of a scanning line for each of the color components is adjusted by using the reflection mirrors 41Y, 41M, and 41C on the downstream side of the optical paths of the individual lenses 37-2. However, when parallelism of a scanning line for each of the color components is adjusted by using the reflection mirrors 40Y, 40M, and 40C on the upstream side of the optical paths of the individual lenses 37-2, the reflecting angle changed by the position adjustment by the individual lenses 37-2Y, 37-2M, and 37-2C arranged on the downstream side of the reflection mirrors 40Y, 40M, and 40C is relaxed. Therefore, when it is attempted to sufficiently adjust parallelism of a scanning line, an amount of movement of the reflection mirrors 40Y, 40M, and 40C increases. This substantially affects defocus and an fθ characteristic in the main scanning direction. Therefore, it is preferable to adjust parallelism of a scanning line for each of the color components using the reflection mirrors 41Y, 41M, and 41C on the downstream side of the optical paths of the individual lenses 37-2.

Figure 9:
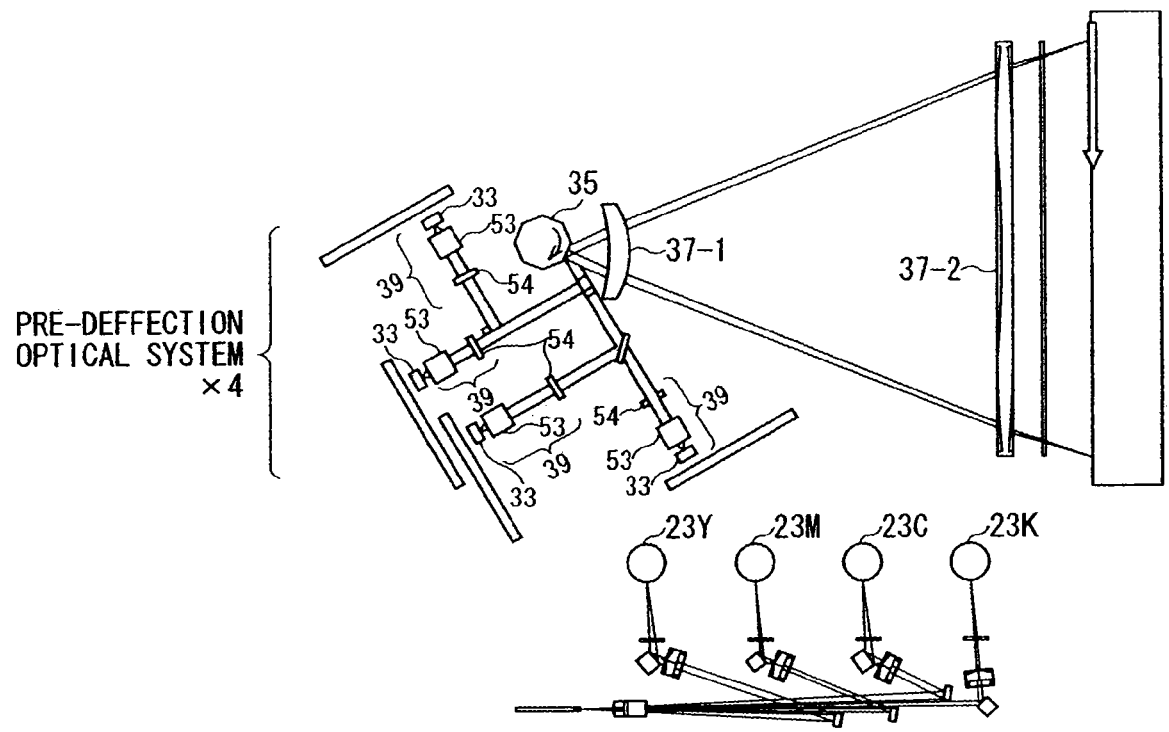
FIG. 9 is a diagram showing a scanning optical system which has plural pre-deflection optical system and forms plural scanning lines by deflecting respective luminous fluxes emitted from respective light sources, using deflection surfaces parallel to a rotation center axis of the deflecting device and then, imaging the luminous fluxes by a post-deflection optical system.

A scanning optical system which is expressly showed in this embodiment is a scanning optical system which has one pre-deflection optical system 39 and forms plural scanning lines by separating one or plural luminous fluxes emitted from one light source 33, in the sub-scanning direction for each of color components using plural deflection surfaces having different angles with respect to the rotation center axis of the deflecting device 35 and then, imaging the luminous fluxes by the post-deflection optical system 37. It is not limited to this. For example, as shown in FIG. 9, a scanning optical system which has plural pre-deflection optical system 39 in accordance with color components and forms plural scanning lines by deflecting respective luminous fluxes emitted from respective light sources 33, using deflection surfaces parallel to a rotation center axis of the deflecting device 35 and then, imaging the luminous fluxes by a post-deflection optical system 37, may be used as long as the post-deflection optical system 37 includes at least the shared lens 37-1 used for all scanning lines and the individual lens 37-2 corresponding to each of the scanning lines. As a result, the above-mentioned effect similarly can be obtained.

Furthermore, as shown in FIGS. 10A to 10D, a scanning optical system which substantially focusing all luminous fluxes on one deflection surface by a cylindrical lens 54 may be used as long as the post-deflection optical system 37 includes at least the shared lens 37-1 used for all scanning lines and the individual lens 37-2 corresponding to each of the scanning lines. As a result, the above-mentioned effects similarly can be obtained.

What is claimed is:
1. An optical beam scanning apparatus comprising:
a light source configured to emit one or plural luminous fluxes;
a pre-deflection optical system configured to form the luminous fluxes emitted from the light source to image the luminous fluxes as a line image in a direction corresponding to a main scanning direction;
a light deflecting device configured to scan the luminous fluxes against a scanning object in the main scanning direction; and
a post-deflection optical system configured to at least include one or plural first optical elements which act on the luminous fluxes for all color components, plural second optical elements which respectively act on the luminous fluxes for each of color components, plural reflection mirrors which are respectively provided on a downstream side of the second optical elements in plural optical paths for all colors except for black and reflect luminous fluxes emitted from the second optical elements, and a position adjusting mechanism which adjusts positions of the reflection mirrors, the post-deflection optical system images the luminous fluxes scanned by the light deflecting device on the scanning object, the optical path for black being a reference for adjusting parallelism of a scanning line of each of optical paths in which the second optical elements are included.

2. The optical beam scanning apparatus according to claim 1, wherein one set of two reflection mirrors and only one reflection mirror are provided in the post-deflection optical system in accordance with the color components.

3. The optical beam scanning apparatus according to claim 1, wherein the position adjusting mechanism adjusts positions of the reflection mirrors such that incident positions on the reflection mirrors of the luminous fluxes emitted from the second optical elements are changed.

4. The optical beam scanning apparatus according to claim 3, wherein the position adjusting mechanism adjusts positions of the reflection mirrors by moving the reflection mirrors along respective optical paths on the reflection mirrors.

5. The optical beam scanning apparatus according to claim 4, wherein one end side of the reflection mirror is substantially fixed, and the position adjusting mechanism adjusts positions of the reflection mirrors by moving another end side of the reflection mirror along respective incident optical paths on the reflection mirrors.

6. The optical beam scanning apparatus according to claim 3, wherein the position adjusting mechanism adjusts positions of the reflection mirrors by moving the reflection mirrors in a direction substantially orthogonal to a reflection surface of the reflection mirror.

7. The optical beam scanning apparatus according to claim 6, wherein one end side of the reflection mirror is substantially fixed, and the position adjusting mechanism adjusts positions of the reflection mirrors by moving another end side of the reflection mirror in the direction substantially orthogonal to a reflection surface of the reflection mirror.

8. An optical beam scanning apparatus comprising:
a light source configured to emit one or plural luminous fluxes;
a pre-deflection optical system configured to form the luminous fluxes emitted from the light source to image the luminous fluxes as a line image in a direction corresponding to a main scanning direction;
a light deflecting device configured to scan the luminous fluxes against a scanning object in the main scanning direction, and includes deflection surfaces provided in the light deflecting device having different angles with respect to a rotation center axis for each of color components; and
a post-deflection optical system configured to at least include one or plural first optical elements which act on the luminous fluxes for all color components, plural second optical elements which respectively act on the luminous fluxes for each of color components, plural reflection mirrors which are respectively provided on a downstream side of the second optical elements in plural optical paths and reflect luminous fluxes emitted from the second optical elements, and a position adjusting mechanism which adjusts positions of the reflection mirrors, the post-deflection optical system images the luminous fluxes scanned by the light deflecting device on the scanning object.

9. An image forming apparatus having an optical beam scanning apparatus, the optical beam scanning apparatus comprising:
a light source configured to emit one or plural luminous fluxes;
a pre-deflection optical system configured to form the luminous fluxes emitted from the light source to image the luminous fluxes as a line image in a direction corresponding to a main scanning direction;
a light deflecting device configured to scan the luminous fluxes against a scanning object in the main scanning direction; and
a post-deflection optical system configured to at least include one or plural first optical elements which act on the luminous fluxes for all color components, plural second optical elements which respectively act on the luminous fluxes for each of color components, plural reflection mirrors which are respectively provided on a downstream side of the second optical elements in plural optical paths for all colors except for black and reflect luminous fluxes emitted from the second optical elements, and a position adjusting mechanism which adjusts positions of the reflection mirrors, the post-deflection optical system images the luminous fluxes scanned by the light deflecting device on the scanning object, the optical path for black being a reference for adjusting parallelism of a scanning line of each of optical paths in which the second optical elements are included.

10. An image forming apparatus having an optical beam scanning apparatus, the optical beam scanning apparatus comprising:
a light source configured to emit one or plural luminous fluxes;
a pre-deflection optical system configured to form the luminous fluxes emitted from the light source to image the luminous fluxes as a line image in a direction corresponding to a main scanning direction;
a light deflecting device configured to scan the luminous fluxes against a scanning object in the main scanning direction, and includes deflection surfaces provided in the light deflecting device having different angles with respect to a rotation center axis for each of color components; and
a post-deflection optical system configured to at least include one or plural first optical elements which act on the luminous fluxes for all color components, plural second optical elements which respectively act on the luminous fluxes for each of color components, plural reflection mirrors which are respectively provided on a downstream side of the second optical elements in plural optical paths and reflect luminous fluxes emitted from the second optical elements, and a position adjusting mechanism which adjusts positions of the reflection mirrors, the post-deflection optical system images the luminous fluxes scanned by the light deflecting device on the scanning object.

11. The image forming apparatus according to claim 9, wherein one set of two reflection mirrors and only one reflection mirror are provided in the post-deflection optical system in accordance with the color components.

12. The image forming apparatus according to claim 9, wherein the position adjusting mechanism adjusts positions of the reflection mirrors such that incident positions on the reflection mirrors of the luminous fluxes emitted from the second optical elements are changed.

13. The image forming apparatus according to claim 12, wherein the position adjusting mechanism adjusts positions of the reflection mirrors by moving the reflection mirrors along respective optical paths on the reflection mirrors.

14. The image forming apparatus according to claim 13, wherein one end side of the reflection mirror is substantially fixed, and the position adjusting mechanism adjusts positions of the reflection mirrors by moving another end side of the reflection mirror along respective incident optical paths on the reflection mirrors.

15. The image forming apparatus according to claim 12, wherein the position adjusting mechanism adjusts positions of the reflection mirrors by moving the reflection mirrors in a direction substantially orthogonal to a reflection surface of the reflection mirror.

16. The image forming apparatus according to claim 15, wherein one end side of the reflection mirror is substantially fixed, and the position adjusting mechanism adjusts positions of the reflection mirrors by moving another end side of the reflection mirror in the direction substantially orthogonal to a reflection surface of the reflection mirror.

* * * * *